(12) United States Patent
Alberth, Jr. et al.

(10) Patent No.: US 9,531,418 B2
(45) Date of Patent: Dec. 27, 2016

(54) TUNABLE INTER-ANTENNA ISOLATION

(75) Inventors: William P. Alberth, Jr., Prairie Grove, IL (US); Gregory R. Black, Vernon Hills, IL (US); Armin W. Klomsdorf, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 633 days.

(21) Appl. No.: 13/568,158

(22) Filed: Aug. 7, 2012

(65) Prior Publication Data

US 2014/0044021 A1 Feb. 13, 2014

(51) Int. Cl.
*H04B 1/18* (2006.01)
*H04B 1/525* (2015.01)

(52) U.S. Cl.
CPC ............. *H04B 1/18* (2013.01); *H04B 1/525* (2013.01)

(58) Field of Classification Search
CPC ..... H04B 1/0458; H04B 1/18; H04B 17/0007; H04B 1/0475; H04B 7/0608
See application file for complete search history.

(56) References Cited

U.S. PATENT DOCUMENTS

| | | |
|---|---|---|
| 6,765,536 B2 | 7/2004 | Phillips et al. |
| 6,920,315 B1 | 7/2005 | Wilcox et al. |

(Continued)

FOREIGN PATENT DOCUMENTS

| | | |
|---|---|---|
| CN | 1917377 A | 2/2007 |
| WO | 0171846 A1 | 9/2001 |

(Continued)

OTHER PUBLICATIONS

Alcatel-Lucent: "Harmonics and Intermodulation Products cased by LTE Advanced CArrier Aggregation of Band 2, 4 or 5 plus additional new 716-728 downlink", 3GPP Draft; R4-113984, 3rd Generation Partnership Project 93GPP), Mobile Competence Centre; 640, Route Des Lucioles; F-06921 Sophia-Antipolis Cedex; France, vol. RAN WG4, no. Athens, Greece; Aug. 22, 2011 Aug. 17, 2011, all pages.

(Continued)

*Primary Examiner* — Jung Park
(74) *Attorney, Agent, or Firm* — Faegre Baker Daniels LLP

(57) ABSTRACT

A method and system performs antenna tuning to minimize interference affecting signal reception within a wireless communication device. An antenna tuner controller determines whether the wireless communication device concurrently provides (a) simultaneous signal transmission and reception and (b) dual signal propagation. In response to determining that the wireless communication device concurrently provides the simultaneous signal transmission and reception and the dual signal propagation, the antenna tuner controller determines a current mode of operation corresponding to simultaneous signal transmission and reception and the dual signal propagation. Based on the mode of operation determined, the antenna tuner controller identifies a priority for performing antenna isolation to minimize interference affecting signal reception when the wireless communication device actively communicates within the specific mode of operation. In response to the identifying the priority for performing antenna isolation, the antenna tuner controller performs antenna impedance tuning that provides antenna isolation corresponding to the priority.

20 Claims, 5 Drawing Sheets

(56) References Cited

U.S. PATENT DOCUMENTS

| | | | |
|---|---|---|---|
| 7,675,469 | B2 | 3/2010 | Ohba et al. |
| 2009/0285135 | A1* | 11/2009 | Rousu et al. ............. 370/297 |
| 2010/0302123 | A1 | 12/2010 | Knudsen et al. |
| 2011/0116404 | A1 | 5/2011 | Shimizu |
| 2011/0249576 | A1* | 10/2011 | Chrisikos et al. ........ 370/252 |
| 2011/0300812 | A1* | 12/2011 | Camp et al. ............... 455/77 |
| 2012/0188917 | A1 | 7/2012 | Knox |
| 2013/0265890 | A1* | 10/2013 | Ali et al. ................. 370/252 |

FOREIGN PATENT DOCUMENTS

| | | |
|---|---|---|
| WO | 2009115996 A1 | 9/2009 |
| WO | 2011/084715 A1 | 7/2011 |

OTHER PUBLICATIONS

Patent Cooperation Treaty, International Search Report and Written Opinion of the International Searching Authority for International Application No. PCT/US2013053706, Nov. 4, 2013, 12 pages.

Silicon Labs: Broadcast FM Radio Receiver for Consumer Electronics, Si4704/05-D50, Copyright 2010 by Silicon Laboratories, Confidential Rev. 1.0 12/10, all pages.

The State Intellectual Property Office of the People's Republic of China; Chinese Patent Application No. 201380042191.1; Chinese Office Action dated Mar. 23, 2016.

* cited by examiner

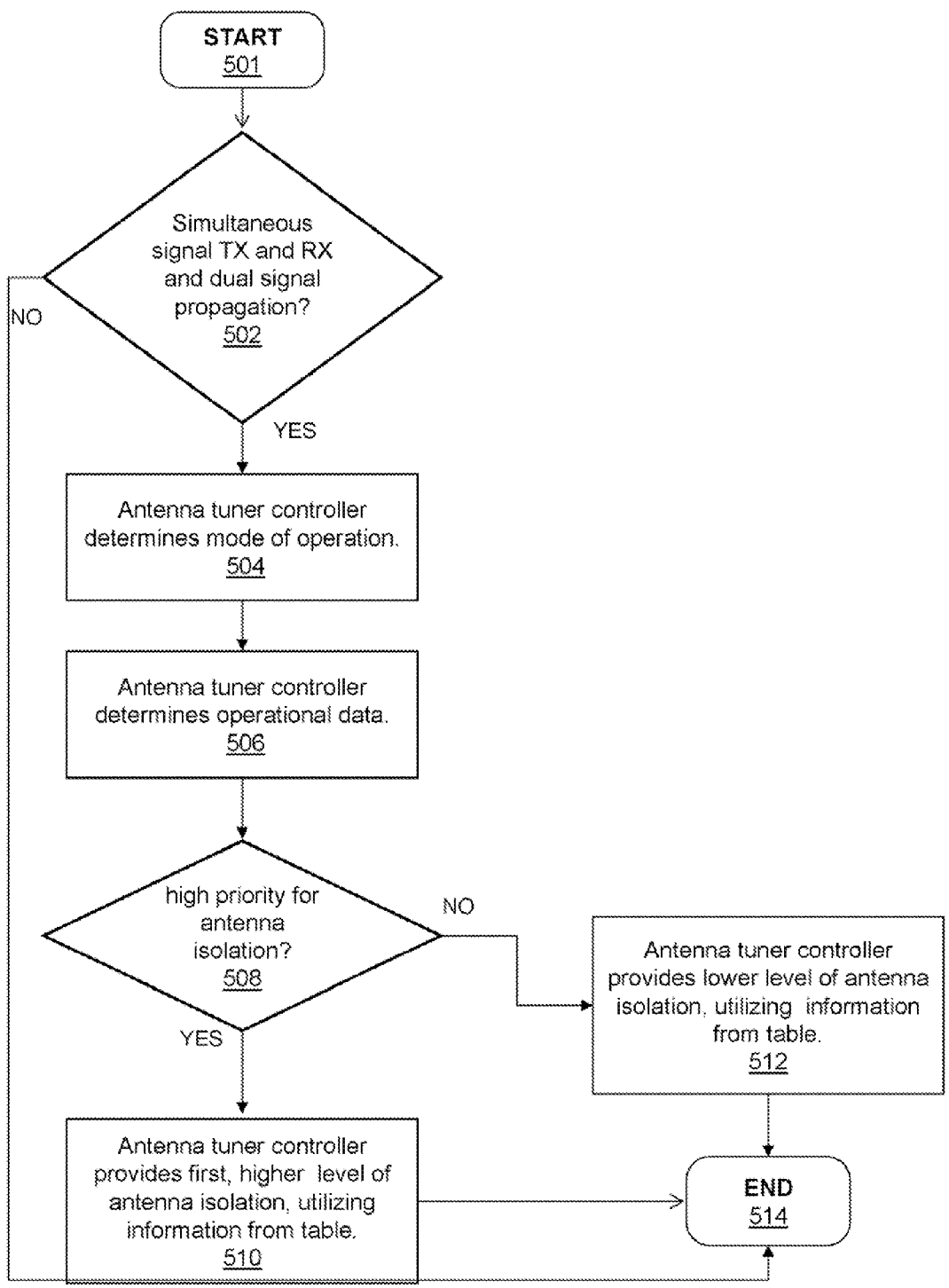

TUNABLE INTER-ANTENNA ISOLATION

BACKGROUND

1. Technical Field

The present disclosure relates in general to wireless communication devices and in particular to antenna isolation in wireless communication devices.

2. Description of the Related Art

Simultaneous Voice and Long Term Evolution (SVLTE) data transmission comprising Code Division Multiple Access (CDMA) 1X voice and LTE data transmission is a requirement for many CDMA/LTE operators. For SVLTE or simultaneous voice and data (SVDO), blocking signals at a corresponding receiver generated from an intermodulation of a transmitter signal with jamming signals can cause desensitization to one or more receivers. In many cases, the level of desensitization may be too high to be managed effectively using maximum output power reduction.

BRIEF DESCRIPTION OF THE DRAWINGS

The described embodiments are to be read in conjunction with the accompanying drawings, wherein:

FIG. 5 is a flow chart illustrating one embodiment of a method for providing antenna isolation to minimize interference affecting signal reception within a wireless communication device, according to one embodiment.

DETAILED DESCRIPTION

Figure 1:
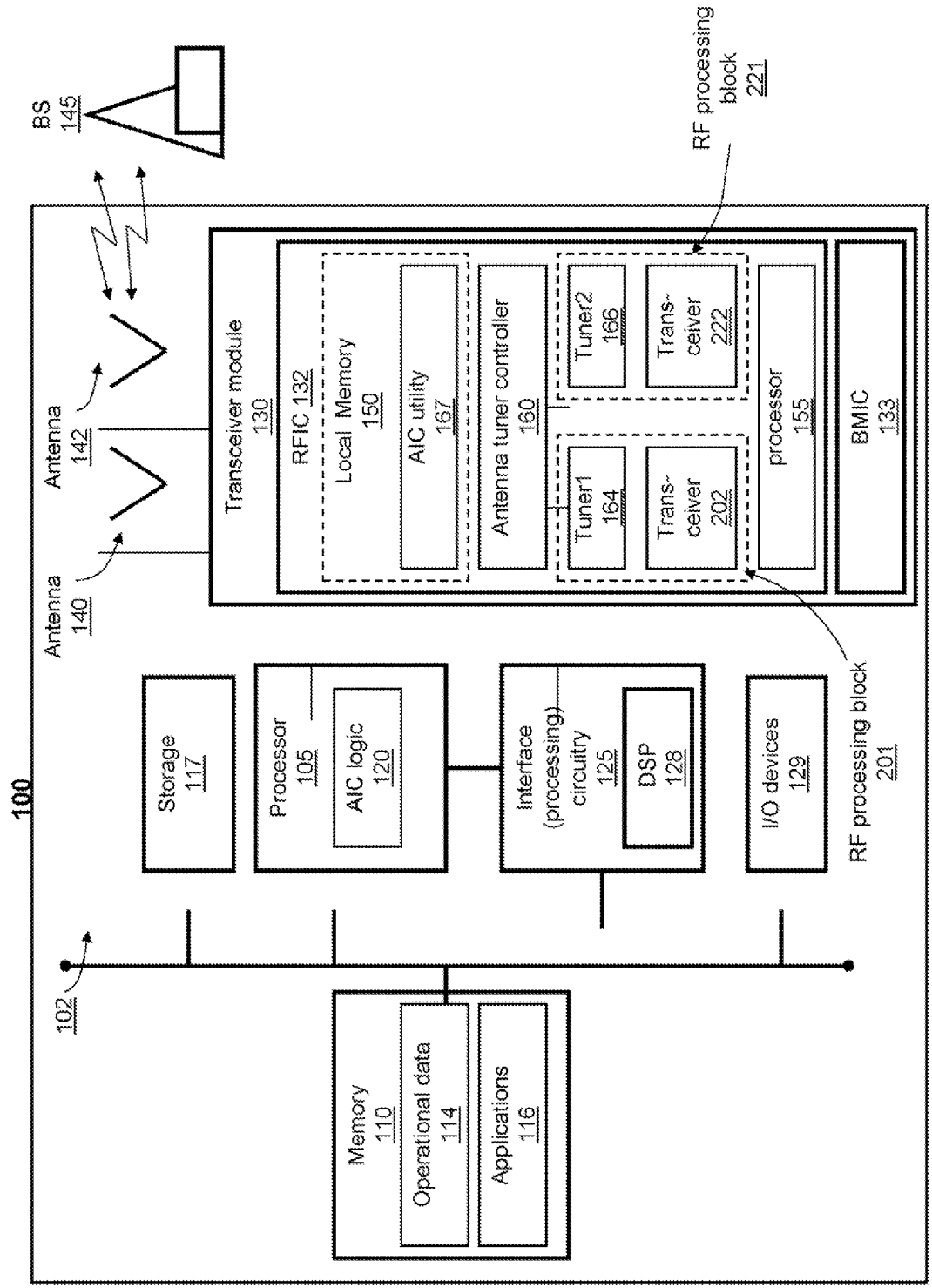
FIG. 1 is a block diagram illustrating an example wireless communication device within which the various features of the described embodiments can be advantageously implemented, according to one embodiment.

The illustrative embodiments provide a method and system for performing antenna tuning to minimize interference affecting signal reception within a wireless communication device. An antenna tuner controller determines whether the wireless communication device concurrently provides (a) simultaneous signal transmission and reception and (b) dual signal propagation. In response to determining that the wireless communication device concurrently provides (a) simultaneous signal transmission and reception and (b) dual signal propagation, the antenna tuner controller determines a mode of operation that concurrently provides the simultaneous signal transmission and reception and the dual signal propagation. Based on the mode of operation determined, the antenna tuner controller identifies a priority for performing antenna isolation to minimize interference affecting signal reception when the wireless communication device communicates within a specific mode of operation. In response to the priority for performing antenna isolation being a first pre-defined or high priority, the antenna tuner controller performs a first antenna impedance tuning that provides a corresponding high degree of antenna isolation. However, if the priority is a second, lower priority, the antenna tuner controller triggers a second antenna impedance tuning that provides a lower degree of antenna isolation.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards, such as Global System for Mobile Communications (GSM) Code Division Multiple Access (CDMA), Orthogonal Frequency Division Multiple Access (OFDMA), and similar systems. In addition, wireless communication device 100 is able to utilize a number of communication means (e.g., carrier aggregation and simultaneous voice and LTE (SVLTE)) that concurrently enables (a) simultaneous signal transmission and reception and (b) at least one of dual signal transmission and dual signal reception. In one or more embodiments, the wireless communication device can be a mobile cellular device/phone or smartphone, or laptop, netbook or tablet computing device, or other types of communications devices. Wireless communication device 100 comprises processor 105 and interface circuitry 125, which are connected to memory component 110 via signal bus 102. Interface circuitry 125 includes digital signal processor (DSP) 128. Wireless communication device 100 also includes a transceiver module 130 for sending and receiving communication signals. In at least some embodiments, the sending and receiving of communication signals occur wirelessly and are facilitated by one or more antennas 140 and 142 coupled to the transceiver module 130. The number of antennas can vary from device to device, ranging from two or more antennas, and the presentation within wireless communication device 100 of two antennas 140, 142 is merely for illustration.

Wireless communication device 100 is able to wirelessly communicate to base-station 145 via antenna 140 and antenna 142. Base station 145 can be any one of a number of different types of network stations and/or antennas associated with the infrastructure of the wireless network and configured to support uplink and downlink communication via one or more of the wireless communication protocols, as known by those skilled in the art.

Transceiver module 130 comprises baseband modem integrated circuit (BMIC) 133 and radio frequency integrated circuit (RFIC) 132. RFIC 132 comprises a memory or storage system 150, antenna tuner controller 160 and RF processing blocks 201 and 221. RF processing block 201 comprises antenna tuner 164, transceiver 202, and other processing block components (not shown). Similarly, RF processing block 221 comprises antenna tuner 166, transceiver 222, and other processing block components shown in FIG. 2. In one implementation, antenna tuner controller 160 is communicatively coupled to both antenna tuners 164 and 166. In one embodiment, RFIC 132 also includes local processor 155, which may be described as a digital signal processor (DSP). According to one aspect of the disclosure, local memory/storage 150 includes therein firmware, such as Antenna Isolation Controller (AIC) utility 167, which supports the various processing functions of RFIC 132. The structural makeup of RFIC 132 is described in greater detail in FIG. 2.

In addition to the above described hardware components of wireless communication device 100, various features of the invention may be completed/supported via software or firmware code and/or logic stored within at least one of memory 110 and local memory 150, and respectively executed by DSP 128, Processor 105, or local processor 155 of RFIC 132. Thus, for example, illustrated within local memory 150 are a number of software, firmware, logic components, ormodules, including applications 116 and AIC utility 167.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
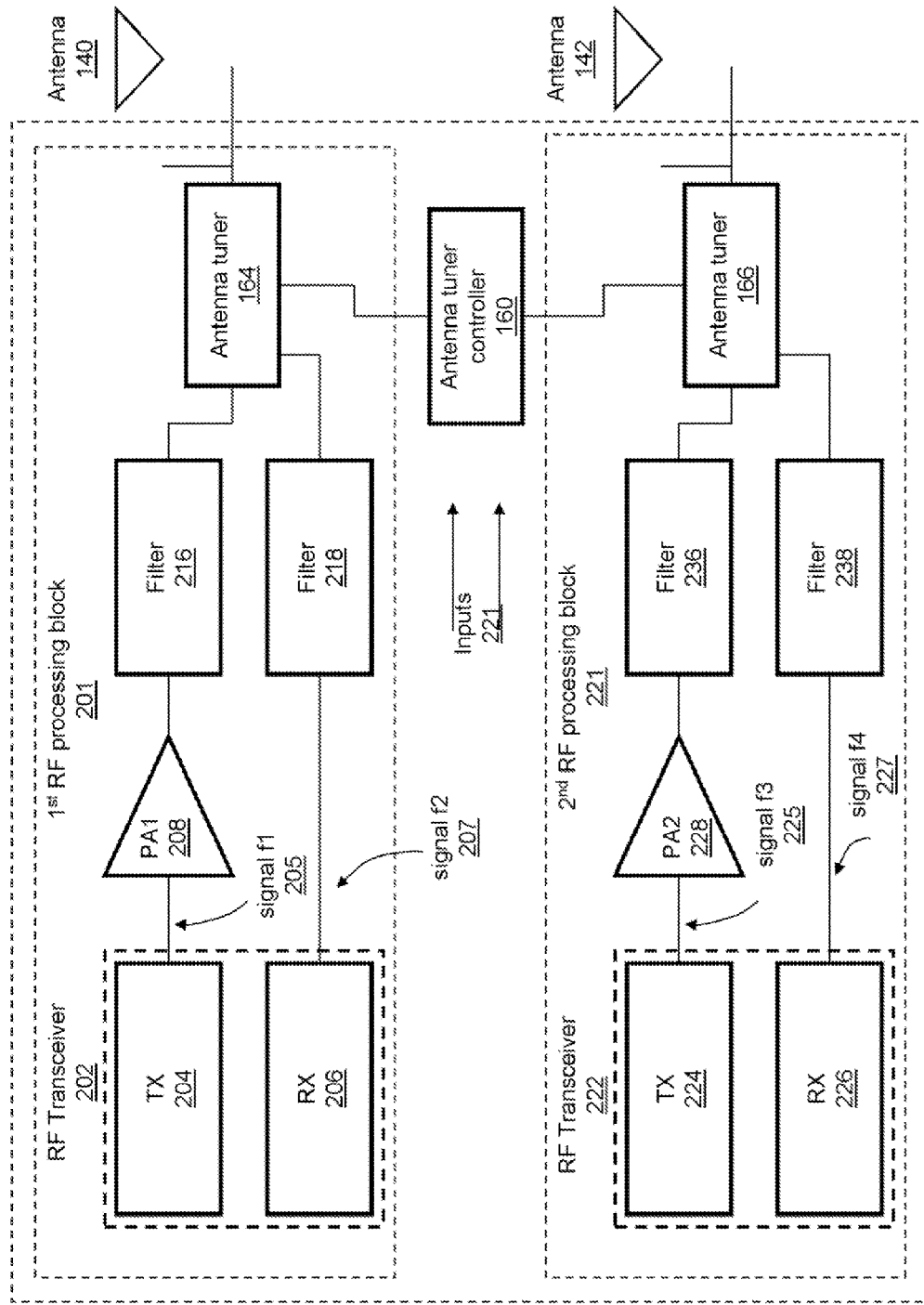
FIG. 2 provides a block diagram representation of a radio frequency integrated circuit (RFIC), according to one embodiment.

FIG. 2 provides a block diagram representation of a structural configuration of radio RFIC 132, according to one embodiment. RFIC 132 comprises first radio frequency (RF) processing block 201 and second RF processing block 221 each co-located within relative close proximity of the other RF processing block. First RF processing block 201 comprises first RF transceiver 202, which includes first RF transmitter (TX) 204 and first RF receiver (RX) 206. First RF processing block 201 also comprises first power amplifier (PA1) 208, filters 216, 218 and antenna tuner 164. Filter 216 is coupled to an output port of power amplifier 208 and to a port of antenna tuner 164. Filter 218 is coupled to an output port of first RF receiver 206 and to a port of antenna tuner 164. Antenna 140 is connected by antenna tuner 164 to first RF processing block 201. TX 204 provides signal f1 205, and RX 206 receives signal f2 207.

Second RF processing block 221 comprises second RF transceiver 222 which includes second RF transmitter 224 and second RF receiver 226. Second RF processing block 221 also comprises second power amplifier (PA2) 228, filters 236, 238 and antenna tuner 166. Filter 236 is coupled to an output port of power amplifier 228 and to a port of antenna tuner 166. Filter 238 is coupled to an output port of second RF receiver 226 and to a port of antenna tuner 166. Antenna 142 is connected by antenna tuner 166 to second RF processing block 221. TX 224 provides signal f3 225, and RX 226 receives signal f4 227.

In RFIC 132, antenna tuner controller 160 determines whether wireless communication device 100 concurrently provides (a) simultaneous signal transmission and reception and (b) at least one of dual signal transmission and dual signal reception. The term "dual signal propagation," described in more detail below, is used herein to refer to any one of (a) dual signal transmission, (b) dual signal reception and (c) both dual signal transmission and dual signal reception. In response to antenna tuner controller 160 determining that wireless communication device 100 concurrently provides (a) simultaneous signal transmission and reception and (b) dual signal propagation, antenna tuner controller 160 determines a mode of operation of wireless communication device 100 associated with the simultaneous signal transmission and reception and the dual signal propagation. The mode of operation is frequently associated with concurrent utilization of multiple wireless communication technologies or radio access technologies (RATs). As a result of multiple RATS being concurrently active in wireless communication device 100, the corresponding mode of operation can cause an associated interference affecting signal reception within wireless communication device 100.

Based on determining the mode of operation that is active within wireless communication device 100, antenna tuner controller 160 identifies a priority for performing antenna isolation to minimize interference that affects signal reception when wireless communication device 100 actively operates in that mode of operation. In response to the priority for performing antenna isolation being a first or high priority, antenna tuner controller 160 performs a first antenna impedance tuning that provides a corresponding higher degree of antenna isolation. However, if the priority is a second, lower priority, antenna tuner controller 160 triggers a second antenna impedance tuning that provides a lower degree of antenna isolation.

Wireless communication device 100 provides simultaneous signal transmission and reception when at least one transmitter (e.g., TX 204 and/or 224) and at least one receiver (RX 206 and/or 226) of wireless communication device 100 are actively operating to enable propagation of corresponding signals.

Wireless communication device 100 provides dual signal propagation when at least two transmit signals (e.g., signal f1 205, signal f3 225) and/or at least two receive signals (e.g., signal f2 207, signal fb 4 227) are simultaneously propagated by wireless communication device 100. In one embodiment, two transceivers, each having a single transmitter and a single receiver, provide dual signal propagation when (a) the first transceiver and the second transceiver collectively transmit two signals and/or (b) the first receiver and the second receiver collectively receives two signals. As described herein, a single transceiver comprises a single transmitter and a single receiver. A dual transceiver or multi-transceiver comprises multiple transmitters and multiple receivers. A single transmitter provides a single transmission source and port. When wireless communication device 100 provides dual signal propagation using transmit signals, each of the first transmitter and the second transmitter simultaneously transmits a corresponding single transmit signal. However, in an alternate embodiment, a single transceiver having a single transmitter and a single receiver can provide dual signal propagation when the single transmitter is able to simultaneously transmit, using a single port, at least two signals and/or the single receiver is able to simultaneously receive, using a single port, at least two signals. In one or more embodiments, a single transmitter "simultaneously" transmits at least two signals when the single transmitter transmits at least two signals in a cyclical time interval or sampling period.

Antenna tuner controller 160 determines, for the determined mode of operation, the priority for providing at least one of: (a) a first antenna isolation associated with a transmitter and a receiver of a single transceiver; and (b) a second antenna isolation associated with a transmitter of a first transceiver and a receiver of a second transceiver. In response to the priority for providing at least one of the first antenna isolation and the second antenna isolation during the mode of operation being a first priority, antenna tuner controller 160 performs, using a corresponding antenna tuner, antenna impedance tuning that provides a "pre-determined" degree of antenna isolation that corresponds to at least one of the first antenna isolation and the second antenna isolation. In one embodiment, antenna tuner controller 160 performs the "pre-determined" degree of antenna isolation by providing to a corresponding antenna tuner tuning vectors that are determined using calculations and/or empirical methods. In particular, the tuning vectors are values that have been demonstrated in experiments and/or simulations to provide an acceptable level of performance in minimizing interference affecting signal reception when the wireless communication device communicates within a specific mode of operation. In general, pre-calculated and/or predetermined values can also be described as pre-optimized values. These values are included within firmware or stored within a data structure, such as a table.

In one embodiment, antenna tuner controller 160 receives operational data 114 that define operating conditions and/or an operating environment of wireless communication device 100 via inputs 221, and utilizes operational data 114 to determine the appropriate tuning vectors. For example, in one implementation, antenna tuner controller 160 identifies and/or determines operational data that includes at least one of (a) frequency bands of operation, and (b) a user position affecting antenna impedance, and (c) an application being run on the wireless communication device.

In one embodiment, antenna tuner controller 160 identifies the priority by accessing a stored data structure that identifies pre-defined modes of operation, maps the pre-defined modes of operation to pre-defined operational data, associates the pre-defined modes of operation that are mapped to pre-determined operational data to corresponding priorities of providing antenna isolation. In addition, antenna tuner controller 160 uses the stored data structure (e.g., table 400) to identify antenna isolation vectors associated with a specific level of antenna isolation for the mode of operation.

In one embodiment, antenna tuner controller 160 performs a first antenna tuning by determining a match between (a) the current mode of operation and the determined operational data and (b) the pre-defined modes of operation and the pre-defined operational data. Based on determining the match, antenna tuner controller 160 retrieves corresponding antenna isolation vectors and performs antenna isolation utilizing the corresponding antenna isolation vectors retrieved from the stored data structure.

In response to determining that wireless communication device 100 is not concurrently providing (a) simultaneous signal transmission and reception and (b) dual signal propagation, antenna tuner controller 160 determines, for the mode of operation, the priority of providing antenna isolation associated with one of: (a) a first transmitter and a first receiver of a single transceiver; and (b) a first transmitter of a first transceiver and a second receiver of a second transceiver. In response to the determined priority of providing antenna isolation being the first priority, antenna tuner controller 160 performs antenna impedance tuning that provides the corresponding higher level of antenna isolation specified for that mode of operation.

In one embodiment, antenna tuner controller 160 provides the specified antenna isolation by utilizing preset tuning parameters. These preset tuning parameters are associated with parameters for at least one of: (a) antenna efficiency; (b) total radiated power (TRP) at the corresponding transmitter; and (c) total integrated sensitivity (TIS) at the corresponding receiver. As a result, in addition to providing antenna isolation, antenna tuner controller 160 performs a degree of antenna impedance tuning in order to attain at least one of: (a) a first threshold level of antenna efficiency; (b) a second threshold level of total radiated power (TRP) at a corresponding transmitter; and (c) a third threshold level of total integrated sensitivity (TIS) at a corresponding receiver.

In one embodiment, antenna tuner controller 160 applies a corresponding pre-established weight to a parameter for antenna isolation and respectively applies pre-established weights to parameters for at least one of: (a) antenna efficiency; (b) total radiated power (TRP) at the corresponding transmitter; and (c) total integrated sensitivity (TIS) at the corresponding receiver. As a result, antenna tuner controller 160 performs antenna impedance tuning utilizing the applied pre-established weights. In one embodiment, the pre-established weights are utilized in order to generate the pre-optimized tuning vectors provided by table 400.

In one or more embodiments, antenna tuner controller 160 determines the level of antenna isolation required by monitoring desensitization at a receiver. In response to the desensitization reaching at least a threshold level of desensitization, antenna tuner controller 160, utilizing the stored data structure, selects tuning vectors to perform antenna impedance tuning that (a) provides a specific level of antenna isolation and (b) reduces the monitored desensitization to an acceptable level of desensitization. In response to the desensitization being less that the threshold level of desensitization, antenna tuner controller 160 selects tuning vectors to perform antenna impedance tuning using a weight applied to a parameter for antenna isolation and weights applied to parameters for at least one of: (a) antenna efficiency; (b) total radiated power (TRP) at the corresponding transmitter; and (c) total integrated sensitivity (TIS) at the corresponding receiver.

Antenna tuner controller 160 provides at least a minimum inter antenna isolation. The tuning vectors provided are pre-optimized to restrict the tunable section to only operate in pre-determined tuning zones that provide good isolation. Tuning vectors can be pre-optimized to provide a specific or minimum level of antenna isolation to reflect an increased sensitivity to a receiver that may be adversely affected by particular levels of antenna isolation. In one embodiment, antenna controller 160 can monitor the inter-modulation (IM) power and perform antenna tuning to keep the IM power within acceptable limits.

Figure 3:
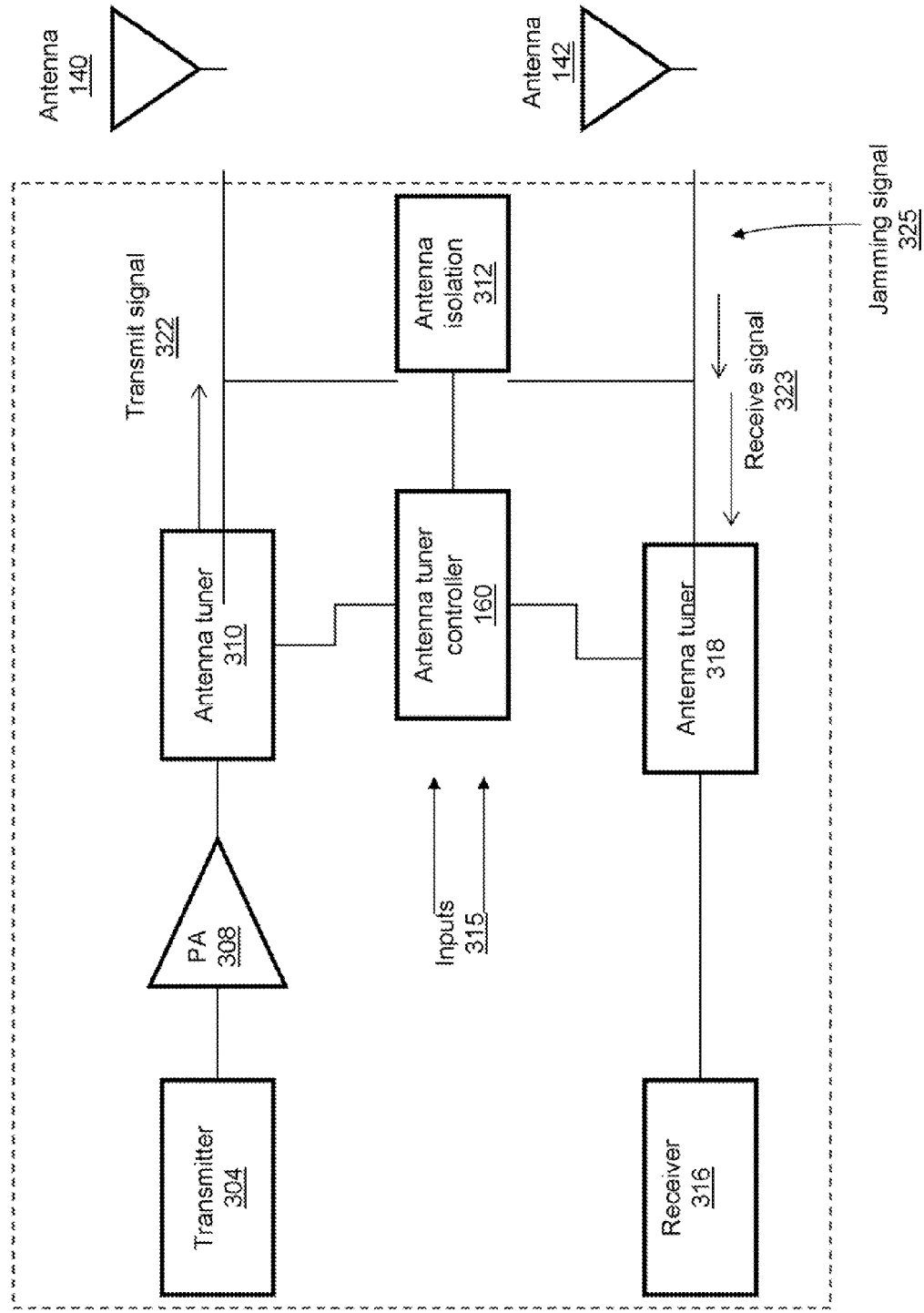
FIG. 3 is a block diagram illustrating an embodiment of an RFIC comprising an antenna isolation block coupled between a transmit antenna port and a receive antenna port, according to one embodiment.

FIG. 3 is a block diagram illustrating an embodiment of RFIC 132 comprising an antenna isolation block coupled between a transmit antenna port and a receive antenna port, according to one embodiment. RFIC 132 comprises RF transmitter 304 and RF receiver 316. RFIC 132 also comprises power amplifier 308 and antenna tuner 310. Antenna tuner 310 is coupled between an output port of power amplifier 308 and antenna 140. RFIC 132 also comprises antenna tuner 318, which is coupled between an output port of receiver 316 and antenna 142. In addition, RFIC 132 comprises antenna isolation circuit 312 coupled between a transmit antenna port corresponding to antenna 140 and a receive antenna port corresponding to antenna 142. RFIC 132 also comprises antenna tuner controller 160, which is coupled to antenna tuner 310, antenna tuner 318 and antenna isolation circuit 312. Antenna tuner controller 160 receives input signals via input ports 315.

Antenna tuner controller 160 can select a second set of tuning vectors that provides a controlled coupling in antenna isolation circuit 312 between antennas 140 and 142. The controlled coupling is out of phase with the radiated coupling between antennas 140 and 142, such that the total coupling is cancelled or reduced. In one embodiment, transmitter 304 and receiver 316 are components of two different transceivers. However, in another embodiment, transmitter 304 and receiver 316 are components of a same transceiver. Based on a configuration that includes antenna isolation circuit 312, antenna tuner controller 160 is able to provide antenna isolation by utilizing (a) a first set of tuning vectors applied at antenna tuners 310 and 318, and (b) a second set of tuning vectors applied at antenna isolation circuit 312.

In one embodiment, antenna isolation circuit 312 comprises a tunable reactance connected between antennas 140 and 142, and antenna tuner controller 160 selects the second set of tuning vectors that provides a reactance equal to an inverse of an imaginary part of a forward complex transmission coefficient "S21" of a two port network corresponding to antennas 140 and 142, at a frequency of operation "f". The reactance "$Z_{TUNABLE\ ISOLATION}$ (f)" is similarly described using the following equation:

$$Z_{TUNABLE\ ISOLATION}(f) = -1 * Im[S_{21}(f)].$$

The reactance is provided to enable parallel resonance to be attained. In another embodiment antenna isolation circuit 312 comprises a switchable reactance. In yet another embodiment antenna isolation circuit 312 comprises a programmable attenuator. In one embodiment, antenna tuner controller 160 accesses a stored data structure (e.g., table 400) to obtain the appropriate tuning vectors.

Antenna tuner controller 160 provides, utilizing the selected tuning vectors, higher antenna isolation between a corresponding transmitter and a corresponding receiver. The frequency of operation f associated with providing antenna isolation is at least one of: (a) a transmitter frequency utilized for transmit signal 322; and (b) a known interfering frequency detectable within receive signal 323 at a corresponding receiver. Antenna tuner controller 160 performs antenna isolation tuned to the transmitter frequency in order to (a) minimize the transmit signal measured at the receiver and (b) reduce blocking signals at the corresponding receiver generated from an intermodulation of a transmitter signal with jamming signals (e.g., jamming signal 325) from a corresponding antenna.

Figure 4:
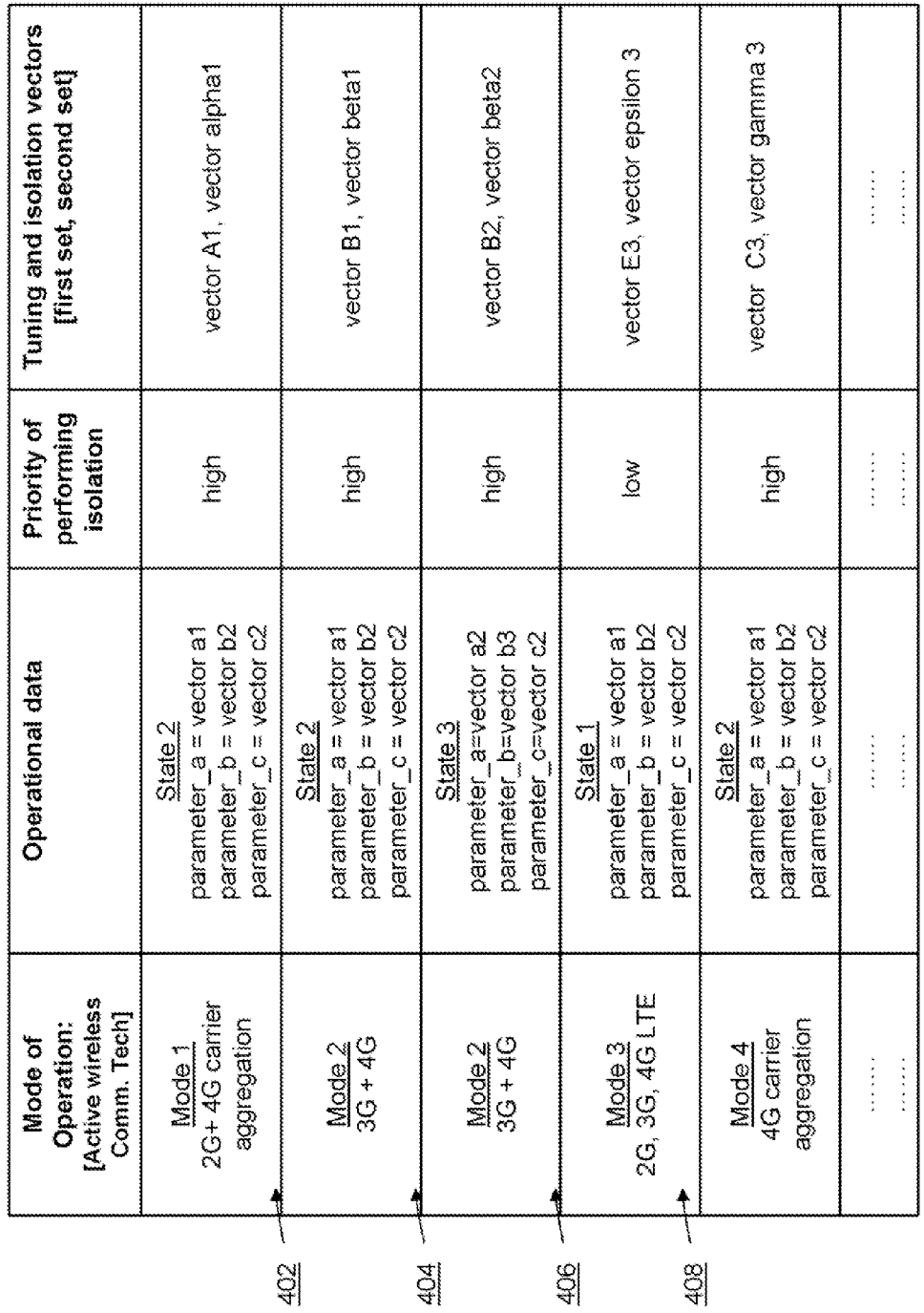
FIG. 4 is a table of pre-defined modes of operation, associated priorities of providing antenna isolation and corresponding tuning vectors, according to one embodiment.

FIG. 4 is a table mapping pre-defined modes of operation with associated priorities of providing antenna isolation, and which provides corresponding tuning vectors, according to one embodiment. In one embodiment, table 400 provides tuning vectors that are determined using calculations and/or empirical methods. In particular, the tuning vectors are values that have been demonstrated in experiments and/or simulations to provide an acceptable level of performance in minimizing interference affecting signal reception when the wireless communication device communicates within a specific mode of operation. Table 400 provides, in a first column, pre-defined modes of operation and, in a second column, operational data that define operating conditions and/or an operating environment of wireless communication device 100. Table 400 identifies a mode of operation by a number of concurrently utilized radio access technologies (RATs). In the second column, table 400 provides parameters, vectors of parameter values, and a corresponding state associated with the operational data. In addition, table 400 provides, in a third column, an associated priority for performing antenna isolation and, in a fourth column, tuning vectors that provide a corresponding antenna isolation.

Referring specifically to table 400, first row 402 of table 400 describes a specific mode of operation identified as "Mode 1". Mode 1 is defined by concurrent utilization of two specific wireless communication technologies or RATs. In particular, "Mode 1" is defined by concurrent utilization of (a) a second generation (2G) RAT such as CDMA and (b) a fourth generation (4G) RAT such as carrier aggregation. A mode of operation may be defined more generally by a level of network assignment of hardware resources and/or of transmit and receive operations. First row 402 also provides operational data that represents a "State 2" operating environment or condition while wireless communication device 100 operates in Mode 1.

In one embodiment, the operational data is associated with (a) frequency bands of operation, (b) a user position affecting antenna impedance, and (c) an application being run on the wireless communication device. As a result, in one implementation, parameter_a provides information that identifies the frequency bands of operation, parameter_b provides information about a de-tuning impact corresponding to user position affecting antenna impedance and parameter_c provides information about an application being executed on wireless communication device 100. First row 402 also provides a vector of values corresponding to each specific parameter. For example, a pre-defined operating or operational state, "State 2", is identified in which state parameter_a is equal to vector-a1. For a particular mode of operation, these vectors of values associated with each respective parameter collectively define a particular state for operating conditions in wireless communication device 100. First row 402 shows that, based on the mode of operation and on the operational data, the priority for performing antenna isolation is high and the appropriate tuning vector is identified as vector A1. Second row 404 and third row 406 both describe "Mode 2". Mode 2 is defined by concurrent utilization of 3G and 4G. However, based on differences in the respective operational data provided by second row 404 and third row 406, the tuning vectors for providing corresponding antenna isolation differ, although the priority for performing antenna isolation is high, in both cases. In particular, second row 404 identifies operational data that places wireless communication device 100 in operational "State 2". However, third row 406 identifies operational data that places wireless communication device 100 in operational "State 3". Tuning vector B1 correspond to second row 404, while tuning vector B2 correspond to third row 406.

Fourth row 408 describes "Mode 3". Mode 3 is associated with a low priority for performing antenna isolation. In one embodiment, antenna tuner controller 160 accesses table 400 if the mode of operation and/or the network assignment of hardware and/or transmit/receive operations exceed a threshold level. In one or more embodiments, the priority of performing antenna isolation may be designated as "high" if the network assignment of hardware and/or transmit/receive operations exceed a threshold level and designated as "low" if the network assignment of hardware and/or transmit/ receive operations does not exceed the threshold level.

In response to determining that wireless communication device 100 concurrently provides (a) simultaneous signal transmission and reception and (b) dual signal propagation, the antenna tuner controller determines a mode of operation, which is associated with concurrent utilization of at least one wireless communications technology. Antenna tuner controller 160 accesses a stored data structure (e.g., table 400) that identifies pre-defined modes of operation, maps the pre-defined modes of operation to pre-defined operational data and associates the pre-defined modes of operation mapped to pre-determined operational data to corresponding priorities of providing antenna isolation. In addition, antenna tuner controller 160 uses the stored data structure, table 400, to identify antenna tuning vectors associated with a specific level of antenna isolation for the mode of operation.

In one embodiment, antenna tuner controller 160 performs a first antenna tuning by searching for a match between (a) the current mode of operation and the determined operational data and (b) the pre-defined modes of operation and the pre-defined operational data within table 400. Based on identifying the match, antenna tuner controller 160 retrieves corresponding antenna isolation vectors and performs antenna isolation utilizing the corresponding antenna isolation vectors retrieved from table 400.

In one or more embodiments, antenna tuner controller 160 determines the level of antenna isolation required by monitoring desensitization at a receiver. In response to the desensitization reaching at least a threshold level of desensitization, antenna tuner controller 160 utilizes a stored data structure table 400 identifying pre-determined desensitization levels mapped to the appropriate tuning vectors, in order to select the appropriate tuning vectors. Antenna tuner controller 160 uses the selected tuning vectors to perform antenna impedance tuning that (a) provides a specific level of antenna isolation and (b) reduces the monitored desensitization to an acceptable level of desensitization.

In one embodiment, antenna tuner controller 160 provides, within table 400, a first set of tuning vectors for a first set of antenna tuners (310 and 318), and a second set of tuning vectors for antenna isolation circuits 312 respectively coupled between antenna feeds of corresponding pairs of antennas. In another embodiment, separate tables are utilized for respective tuning vectors. In one embodiment, when RFIC 132 includes the first set of antenna tuners (310 and 318) and antenna isolation circuit 312, each of the first set and second set of tuning vectors is pre-determined based on the selected or selectable vector values corresponding to the other set of tuning vectors. In one embodiment, the first set of tuning vectors comprises a single vector having values that are respectively applied to two antenna tuners (tuners 310 and 318). In another embodiment, the first set of tuning vectors comprises two vectors that are respectively applied to two antenna tuners (tuners 310 and 318).

FIG. 5 is a flow chart illustrating one embodiment of the method by which the above processes of the illustrative embodiments can be implemented. Specifically, FIG. 5 illustrates one embodiment of a method for providing antenna isolation to minimize interference affecting signal reception within a wireless communication device, according to one embodiment. Although the method illustrated by FIG. 5 may be described with reference to components and functionality illustrated by and described in reference to FIGS. 1-4, it should be understood that this is merely for convenience and alternative components and/or configurations thereof can be employed when implementing the method. Certain portions of the methods may be completed by AIC utility 167 executing on one or more processors (processor 105 or DSP 128) within wireless communication device 100 (FIG. 1), or a processing unit or antenna tuner controller 160 of RFIC 132 (FIGS. 1 and 2). The executed processes then control specific operations of or on RFIC 132. For simplicity is describing the method, all method processes are described from the perspective of RFIC 132 and specifically antenna tuner controller 160.

The method of FIG. 5 begins at initiator block 501 and proceeds to decision block 502 at which antenna tuner controller 160 determines whether wireless communication device 100 concurrently provides (a) simultaneous signal transmission and reception and (b) dual signal propagation. In response to determining that the wireless communication device concurrently provides (a) simultaneous signal transmission and reception and (b) dual signal propagation, antenna tuner controller 160 determines a current mode of operation corresponding to simultaneous signal transmission and reception and the dual signal propagation (block 504). Antenna tuner controller 160 identifies and/or determines operational data that includes at least one of (a) frequency bands of operation, and (b) a user position affecting antenna impedance, and (c) an application being run on the wireless communication device (block 506). The operational data defines the operational environment of wireless communication device 100. Based on determining the mode of operation, at decision block 508, antenna tuner controller 160 determines, utilizing a stored data structure (e.g., table 400), whether there is a high priority for performing antenna isolation to minimize interference affecting signal reception when the mode of operation occurs in wireless communication device 100. In response to the priority for performing antenna isolation being a first or high priority as determined at decision block 508, antenna tuner controller 160, utilizing tuning vectors retrieved from table 400, performs a first antenna impedance tuning that provides a corresponding high degree of antenna isolation (block 510). In response to the priority for performing antenna isolation being a second or low priority, antenna tuner controller 160 performs a second antenna impedance tuning that provides a corresponding lower degree of antenna isolation (block 512). In one embodiment, antenna tuner controller 160 selects tuning vectors according to the mode of operation and the operational data. The process ends at block 514.

The flowchart and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for providing antenna impedance tuning in a wireless communication device having at least one transceiver, the method comprising:
   determining if the wireless communication device concurrently provides (a) simultaneous signal transmission and reception and (b) dual signal propagation;
   in response to determining that the wireless communication device concurrently provides (a) simultaneous signal transmission and reception and (b) dual signal propagation:
      determining a mode of operation of the wireless communication device associated with said simultaneous signal transmission and reception and said dual signal propagation, wherein the mode of operation provides an associated interference affecting signal reception within the wireless communication device while the wireless communication device communicates in that mode of operation; and
      identifying a priority for performing antenna isolation to minimize interference affecting signal reception when the wireless communication device communicates using the determined mode of operation;
   in response to the priority for performing antenna isolation being a first priority, performing a first antenna impedance tuning that provides a corresponding degree of antenna isolation, wherein the first priority is greater than a second priority, which second priority triggers a second antenna impedance tuning that provides a lower degree of antenna isolation than the first antenna impedance.

2. The method of claim 1, further comprising:
   determining, for the mode of operation, the priority for providing at least one of: (a) a first antenna isolation associated with a transmitter and a receiver of a single transceiver; and (b) a second antenna isolation associated with a transmitter of a first transceiver and a receiver of a second transceiver; and in response to the priority for providing at least one of the first antenna isolation and the second antenna isolation during the mode of operation being the first priority, performing antenna impedance tuning that provides a pre-determined degree of antenna isolation that corresponds to at least one of the first antenna isolation and the second antenna isolation.

3. The method of claim 1, wherein:

the determining further comprises determining operational data that includes at least one of (a) frequency bands of operation, and (b) a user position affecting antenna impedance, and (c) an application being run on the wireless communication device, and identifying a priority comprises accessing a stored data structure that identifies pre-defined modes of operation, maps the pre-defined modes of operation to pre-defined operational data, associates the pre-defined modes of operation that are mapped to pre-determined operational data to corresponding priorities of providing antenna isolation, and identifies antenna isolation vectors associated with a specific level of antenna isolation for the at least one mode of operation; and performing a first antenna tuning comprises: identifying a match between (a) the mode of operation and the determined operational data and (b) the pre-defined modes of operation and the pre-defined operational data; in response to identifying the match, retrieving corresponding antenna isolation vectors; and performing antenna isolation utilizing the corresponding antenna isolation vectors retrieved from the stored data structure.

4. The method of claim 1, further comprising:

in response to determining that the wireless communication device is not concurrently providing (a) simultaneous signal transmission and reception and (b) dual signal propagation, determining, for the mode of operation, the priority of providing antenna isolation associated with one of (a) a first transmitter and a first receiver of a single transceiver; and (b) a first transmitter of a first transceiver and a second receiver of a second transceiver; and in response to determining the priority of providing antenna isolation, performing antenna impedance tuning that provides a corresponding level of antenna isolation specified for the mode of operation.

5. The method of claim 1, wherein said performing antenna impedance tuning further comprises:

providing a specified antenna isolation; and performing a degree of antenna impedance tuning in order to attain at least one of: (a) a first threshold level of antenna efficiency; (b) a second threshold level of total radiated power (TRP) at a corresponding transmitter; and (c) a third threshold level of total integrated sensitivity (TIS) at a corresponding receiver.

6. The method of claim 5, further comprising:

respectively applying pre-established weights to parameters for antenna isolation and at least one of: (a) antenna efficiency; (b) total radiated power (TRP) at the corresponding transmitter; and (c) total integrated sensitivity (TIS) at the corresponding receiver; and performing antenna impedance tuning utilizing the applied pre-established weights.

7. The method of claim 6, further comprising:

monitoring desensitization at a receiver;

selecting tuning vectors to perform antenna impedance tuning that (a) provides a specific level of antenna isolation and (b) reduces the monitored desensitization to an acceptable level of desensitization; and in response to the desensitization being less than a threshold level of desensitization, selecting tuning vectors to perform antenna impedance tuning using a weight applied to a parameter for antenna isolation and weights applied to parameters for at least one of: (a) antenna efficiency; (b) total radiated power (TRP) at the corresponding transmitter; and (c) total integrated sensitivity (TIS) at the corresponding receiver.

8. The method of claim 1, further comprising:

selecting tuning vectors that provides a corresponding reactance equal to an inverse of an imaginary part of a forward complex transmission coefficient "S21" of a corresponding two port antenna network, at a frequency of operation "f", wherein said corresponding reactance is provided to enable parallel resonance to be attained;

providing, utilizing the selected tuning vectors, a maximum antenna isolation between a corresponding transmitter and a corresponding receiver;

wherein the frequency of operation f associated with providing antenna isolation is at least one of: (a) a transmitter frequency; and (b) a known interfering frequency detectable at a corresponding receiver; and wherein said performing antenna isolation occurs at the transmitter frequency in order to (a) minimize the transmit signal measured at the receiver and (b) reduce blocking signals at the corresponding receiver generated from an intermodulation of a transmitter signal with jamming signals from a corresponding antenna.

9. A radio frequency integrated circuit (RFIC) comprising:

at least one transceiver;

an antenna tuner capable of providing a plurality of antenna tuning states and specific degrees of antenna isolation; and an antenna tuner controller that:

determines if the wireless communication device concurrently provides (a) simultaneous signal transmission and reception and (b) dual signal propagation;

in response to determining that the wireless communication device concurrently provides (a) simultaneous signal transmission and reception and (b) dual signal propagation:

determines a mode of operation of the wireless communication device associated with said simultaneous signal transmission and reception and said dual signal propagation, wherein the mode of operation provides an associated interference affecting signal reception within the wireless communication device while the wireless communication device communicates in that mode; and identifies a priority for performing antenna isolation to minimize interference affecting signal reception when the wireless communication device communicates using the determined mode of operation;

in response to the priority for performing antenna isolation being a first priority, performs a first antenna impedance tuning that provides a corresponding degree of antenna isolation, wherein the first priority is greater than a second priority, which second priority triggers a second antenna impedance tuning that provides a lower degree of antenna isolation than the first antenna impedance.

10. The RFIC of claim 9, wherein the antenna tuner controller:
determines, for the mode of operation, the priority for providing at least one of: (a) a first antenna isolation associated with a transmitter and a receiver of a single transceiver; and (b) a second antenna isolation associated with a transmitter of a first transceiver and a receiver of a second transceiver; and
in response to the priority for providing at least one of the first antenna isolation and the second antenna isolation during the mode of operation being the first priority, performs antenna impedance tuning that provides a pre-determined degree of antenna isolation that corresponds to at least one of the first antenna isolation and the second antenna isolation.

11. The RFIC of claim 9, wherein the antenna tuner controller:
determines operational data that includes at least one of (a) frequency bands of operation, and (b) a user position affecting antenna impedance, and (c) an application being run on the wireless communication device, and
identifies a priority by accessing a stored data structure that identifies pre-defined modes of operation, mapping the pre-defined modes of operation to pre-defined operational data, associating the pre-defined modes of operation that are mapped to pre-determined operational data to corresponding priorities of providing antenna isolation, and identifying antenna isolation vectors associated with a specific level of antenna isolation for the at least one mode of operation; and
performs a first antenna tuning by: identifying a match between (a) the mode of operation and the determined operational data and (b) the pre-defined modes of operation and the pre-defined operational data; in response to identifying the match, retrieving corresponding antenna isolation vectors; and performing antenna isolation utilizing the corresponding antenna isolation vectors retrieved from the stored data structure.

12. The RFIC of claim 9, wherein the antenna tuner controller:
in response to determining that the wireless communication device is not concurrently providing (a) simultaneous signal transmission and reception and (b) dual signal propagation, determines, for the mode of operation, the priority of providing antenna isolation associated with one of (a) a first transmitter and a first receiver of a single transceiver; and (b) a first transmitter of a first transceiver and a second receiver of a second transceiver; and
in response to determining the priority of providing antenna isolation, performs antenna impedance tuning that provides a corresponding level of antenna isolation specified for the mode of operation.

13. The RFIC of claim 9, wherein the antenna tuner controller:
monitors desensitization at a receiver;
selects tuning vectors to perform antenna impedance tuning that (a) provides a specific level of antenna isolation and (b) reduces the monitored desensitization to an acceptable level of desensitization; and
in response to the desensitization being less than a threshold level of desensitization, selects tuning vectors to perform antenna impedance tuning using a weight applied to a parameter for antenna isolation and weights applied to parameters for at least one of: (a) antenna efficiency; (b) total radiated power (TRP) at the corresponding transmitter; and (c) total integrated sensitivity (TIS) at the corresponding receiver;
provides, utilizing preset tuning parameters, a specified antenna isolation; and
performs a degree of antenna impedance tuning in order to attain at least one of: (a) a first threshold level of antenna efficiency; (b) a second threshold level of total radiated power (TRP) at a corresponding transmitter; and (c) a third threshold level of total integrated sensitivity (TIS) at a corresponding receiver;
wherein the antenna tuner controller performs the degree of antenna impedance tuning by: respectively applying pre-established weights to parameters for antenna isolation and at least one of: (a) antenna efficiency; (b) total radiated power (TRP) at the corresponding transmitter; and (c) total integrated sensitivity (TIS) at the corresponding receiver; and performing antenna impedance tuning utilizing the applied pre-established weights.

14. The RFIC of claim 9, wherein the antenna tuner controller:
selects tuning vectors that provides a corresponding reactance equal to an inverse of an imaginary part of a forward complex transmission coefficient "S21" of a corresponding two port antenna network, at a frequency of operation "f", wherein said corresponding reactance is provided to enable parallel resonance to be attained;
provides, utilizing the selected tuning vectors, a maximum antenna isolation between a corresponding transmitter and a corresponding receiver;
wherein the frequency of operation f associated with providing antenna isolation is at least one of: (a) a transmitter frequency; and (b) a known interfering frequency detectable at a corresponding receiver; and
wherein said performing antenna isolation occurs at the transmitter frequency in order to (a) minimize the transmit signal measured at the receiver and (b) reduce blocking signals at the corresponding receiver generated from an intermodulation of a transmitter signal with jamming signals from a corresponding antenna.

15. A wireless communication device having a radio frequency integrated circuit (RFIC) coupled to at least two antennas and which includes:
at least one processor;
at least one transceiver;
an antenna tuner capable of providing a plurality of antenna tuning states and specific degrees of antenna isolation; and
an antenna tuner controller that:
determines if the wireless communication device concurrently provides (a) simultaneous signal transmission and reception and (b) dual signal propagation;
in response to determining that the wireless communication device concurrently provides (a) simultaneous signal transmission and reception and (b) dual signal propagation:
determines a mode of operation of the wireless communication device associated with said simultaneous signal transmission and reception and said dual signal propagation, wherein the mode of operation provides an associated interference affecting signal reception within the wireless communication device while the wireless communication device communicates in that mode; and identifies a priority for performing antenna isolation to minimize interference affecting signal reception when the wireless communication device communicates using the determined mode of operation;

in response to the priority for performing antenna isolation being a first priority, performs a first antenna impedance tuning that provides a corresponding degree of antenna isolation, wherein the first priority is greater than a second priority, which second priority triggers a second antenna impedance tuning that provides a lower degree of antenna isolation than the first antenna impedance.

16. The wireless communication device of claim 15, wherein the antenna tuner controller:

determines, for the mode of operation, the priority for providing at least one of: (a) a first antenna isolation associated with a transmitter and a receiver of a single transceiver; and (b) a second antenna isolation associated with a transmitter of a first transceiver and a receiver of a second transceiver; and in response to the priority for providing at least one of the first antenna isolation and the second antenna isolation during the mode of operation being the first priority, performs antenna impedance tuning that provides a pre-determined degree of antenna isolation that corresponds to at least one of the first antenna isolation and the second antenna isolation.

17. The wireless communication device of claim 15, wherein the antenna tuner controller:

determines operational data that includes at least one of (a) frequency bands of operation, and (b) a user position affecting antenna impedance, and (c) an application being run on the wireless communication device, and identifies a priority by accessing a stored data structure that identifies pre-defined modes of operation, mapping the pre-defined modes of operation to pre-defined operational data, associating the pre-defined modes of operation that are mapped to pre-determined operational data to corresponding priorities of providing antenna isolation, and identifying antenna isolation vectors associated with a specific level of antenna isolation for the at least one mode of operation; and performs a first antenna tuning by: identifying a match between (a) the mode of operation and the determined operational data and (b) the pre-defined modes of operation and the pre-defined operational data; in response to identifying the match, retrieving corresponding antenna isolation vectors; and performing antenna isolation utilizing the corresponding antenna isolation vectors retrieved from the stored data structure.

18. The wireless communication device of claim 15, wherein the antenna tuner controller:

in response to determining that the wireless communication device is not concurrently providing (a) simultaneous signal transmission and reception and (b) dual signal propagation, determines, for the mode of operation, the priority of providing antenna isolation associated with one of (a) a first transmitter and a first receiver of a single transceiver; and (b) a first transmitter of a first transceiver and a second receiver of a second transceiver; and in response to determining the priority of providing antenna isolation, performs antenna impedance tuning that provides a corresponding level of antenna isolation specified for the mode of operation.

19. The wireless communication device of claim 15, wherein the antenna tuner controller:

monitors desensitization at a receiver;

selects tuning vectors to perform antenna impedance tuning that (a) provides a specific level of antenna isolation and (b) reduces the monitored desensitization to an acceptable level of desensitization; and in response to the desensitization being less than a threshold level of desensitization, selects tuning vectors to perform antenna impedance tuning using a weight applied to a parameter for antenna isolation and weights applied to parameters for at least one of: (a) antenna efficiency; (b) total radiated power (TRP) at the corresponding transmitter; and (c) total integrated sensitivity (TIS) at the corresponding receiver;

provides, utilizing preset tuning parameters, a specified antenna isolation; and performs a degree of antenna impedance tuning in order to attain at least one of: (a) a first threshold level of antenna efficiency; (b) a second threshold level of total radiated power (TRP) at a corresponding transmitter; and (c) a third threshold level of total integrated sensitivity (TIS) at a corresponding receiver;

wherein the antenna tuner controller performs the degree of antenna impedance tuning by: respectively applying pre-established weights to parameters for antenna isolation and at least one of: (a) antenna efficiency; (b) total radiated power (TRP) at the corresponding transmitter; and (c) total integrated sensitivity (TIS) at the corresponding receiver; and performing antenna impedance tuning utilizing the applied pre-established weights.

20. The wireless communication device of claim 15, wherein the antenna tuner controller:

selects tuning vectors that provides a corresponding reactance equal to an inverse of an imaginary part of a forward complex transmission coefficient "S21" of a corresponding two port antenna network, at a frequency of operation "f", wherein said corresponding reactance is provided to enable parallel resonance to be attained;

provides, utilizing the selected tuning vectors, a maximum antenna isolation between a corresponding transmitter and a corresponding receiver;

wherein the frequency of operation f associated with providing antenna isolation is at least one of: (a) a transmitter frequency; and (b) a known interfering frequency detectable at a corresponding receiver; and wherein said performing antenna isolation occurs at the transmitter frequency in order to (a) minimize the transmit signal measured at the receiver and (b) reduce blocking signals at the corresponding receiver generated from an intermodulation of a transmitter signal with jamming signals from a corresponding antenna.

* * * * *